(12) United States Patent
Shah et al.

(10) Patent No.: US 8,219,713 B2
(45) Date of Patent: Jul. 10, 2012

(54) METHOD AND SYSTEM FOR A NETWORK CONTROLLER BASED PASS-THROUGH COMMUNICATION MECHANISM BETWEEN LOCAL HOST AND MANAGEMENT CONTROLLER

(75) Inventors: Hemal Shah, Trabuco Canyon, CA (US); David Christensen, Foothill Ranch, CA (US); Scott McDaniel, Villa Park, CA (US)

(73) Assignee: Broadcom Corporation, Irvine, CA (US)

( * ) Notice: Subject to any disclaimer, the term of this patent is extended or adjusted under 35 U.S.C. 154(b) by 151 days.

(21) Appl. No.: 12/496,103

(22) Filed: Jul. 1, 2009

(65) Prior Publication Data

US 2010/0005190 A1 Jan. 7, 2010

Related U.S. Application Data

(60) Provisional application No. 61/077,333, filed on Jul. 1, 2008.

(51) Int. Cl.
*G06F 15/16* (2006.01)
(52) U.S. Cl. ....................................................... 709/250
(58) Field of Classification Search .................. 709/223, 709/250
See application file for complete search history.

(56) References Cited

U.S. PATENT DOCUMENTS

| | | | | |
|---|---|---|---|---|
| 5,021,949 A * | 6/1991 | Morten et al. | ................ | 709/231 |
| 5,909,594 A * | 6/1999 | Ross et al. | ................ | 710/20 |
| 5,931,918 A * | 8/1999 | Row et al. | ................ | 719/321 |
| 6,397,230 B1 * | 5/2002 | Carmel et al. | ................ | 709/247 |
| 6,578,160 B1 * | 6/2003 | MacHardy et al. | ........... | 709/223 |
| 6,611,537 B1 * | 8/2003 | Edens et al. | ................ | 370/503 |
| 7,822,907 B2 * | 10/2010 | Slaight | ........................ | 709/250 |
| 2002/0188709 A1 * | 12/2002 | McGraw et al. | ............. | 709/223 |
| 2002/0188718 A1 * | 12/2002 | McGraw et al. | ............. | 709/224 |
| 2003/0109270 A1 * | 6/2003 | Shorty | ........................ | 455/517 |
| 2003/0217177 A1 * | 11/2003 | Gulati | ........................ | 709/238 |
| 2004/0098458 A1 * | 5/2004 | Husain et al. | ................ | 709/204 |
| 2005/0080754 A1 * | 4/2005 | Kashiwabara et al. | ........ | 707/1 |
| 2005/0278383 A1 * | 12/2005 | Kazar et al. | ................ | 709/203 |
| 2007/0067432 A1 * | 3/2007 | Tarui et al. | ................ | 709/223 |
| 2008/0065767 A1 * | 3/2008 | Stachura et al. | .......... | 709/224 |
| 2008/0109545 A1 * | 5/2008 | Shah | ........................ | 709/223 |
| 2010/0005190 A1 * | 1/2010 | Shah et al. | ................ | 709/235 |
| 2010/0192218 A1 * | 7/2010 | Shah et al. | ................ | 726/13 |

OTHER PUBLICATIONS

Distributed Management Task Force; "Network Controller Sideband Interface (NC-SI) Specification"; Distributed Management Task Force; Jun. 26, 2007; Revision 1.0.0a; all pages.*

(Continued)

*Primary Examiner* — Ajay Bhatia
(74) *Attorney, Agent, or Firm* — Thomas, Kayden, Horstemeyer & Risley, LLP (57) ABSTRACT

A network controller in a communication device may be operable to route local host-management traffic between a local host and a management controller within the communication device, wherein the local host may be operable to utilize its network processing resources and function during communication of the local host-management traffic. A dedicated management port may be configured in the network controller to enable receiving and/or transmitting local host-management traffic communicated from and/or to the local host separate from the local host's network traffic communicated via the network controller. The host-management traffic is communicated between the network controller and the management controller via NC-SI interface. The management controller may be assigned Internet protocol (IP) based addressing information for use during routing of local host-management traffic. The IP addressing information may be preset statically, assigned automatically from a list of available addresses, or configured dynamically via a DHCP server function.

16 Claims, 5 Drawing Sheets

OTHER PUBLICATIONS

Broadcom, Standard Broadcom® NetXtreme ® Family Highly Integrated Media Access Controller, Programmer's Reference Guide, Oct. 8, 2008.*

Daniel, D.A.; Hui, J.Y.; , "Virtualization of Local Computer Bus Architectures Over the Internet," Global Telecommunications Conference, 2007. GLOBECOM '07. IEEE , vol., No., pp. 1884-1889, Nov. 26-30, 2007.*

Wiki Intelligent Platform Management Interface, printed Dec. 17, 2011.*

International Search Report and Written Opinion for PCT/US09/49388.

International Preliminary Report on Patentability in Application PCT/US2009/049388 mailed Jan. 13, 2011.

* cited by examiner

METHOD AND SYSTEM FOR A NETWORK CONTROLLER BASED PASS-THROUGH COMMUNICATION MECHANISM BETWEEN LOCAL HOST AND MANAGEMENT CONTROLLER

CROSS-REFERENCE TO RELATED APPLICATIONS/INCORPORATION BY REFERENCE

This patent application makes reference to, claims priority to and claims benefit from U.S. Provisional Application Ser. No. 61/077,333 filed on Jul. 1, 2008.

The above stated application is hereby incorporated herein by reference in its entirety.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to device management. More specifically, certain embodiments of the invention relate to a method and system for a network controller based pass-through communication mechanism between local host and management controller.

BACKGROUND OF THE INVENTION

Information Technology (IT) management may require performing remote management operations of remote systems to perform inventory, monitor, control, and/or verify whether remote systems are up-to-date. For example, management devices and/or consoles may perform such operations as discovering and/or navigating management resources in a network, manipulating and/or administrating management resources, requesting and/or controlling subscribing and/or unsubscribing operations, and executing and/or specific management methods and/or procedures. Management devices and/or consoles may communicate with devices in a network to ensure availability of remote systems, to monitor and/or control the remote systems, to validate that the remote systems may be up-to-date, and/or to perform any security patch updates that may be necessary.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a network controller based pass-through communication mechanism between a local host and a management controller, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a network controller based pass-through communication mechanism between a local host and a management controller. In various embodiments of the invention, a network controller in a communication device may be operable to route local host-management traffic between a local host and a management controller within the communication device. The local host may be operable to utilize its network processing resources and functions during communication of the local host-management traffic via the network controller. A dedicated management port may be configured in a host interface in the network controller to enable receiving and/or transmitting local host-management traffic communicated from and/or to the local host while a separate networking port in the host interface is utilized to enable communicate the local host's network traffic via the network controller. The host-management traffic is communicated between the network controller and the management controller via a NC-SI interface, which is otherwise utilized to communicate management traffic communicated between the management controller and external entities via the network controller. The network controller may be operable to utilize packet filtering to enable routing the local host-management traffic. The packet filtering may be performed on all received inbound packets and/or on outbound packets communicated via the management controller. The management controller may be assigned Internet protocol (IP) based addressing information, a MAC/IP address for example, for use during routing of local host-management traffic. Accordingly, the packet filtering may be performed based on MAC/IP addresses. The IP address assigned to the management controller may be preset statically, assigned automatically from a predetermined list of available IP addresses, and/or configured dynamically via a Dynamic Host Configuration Protocol (DHCP) server function, which may run within the management controller. The local host may be operable to discover availability of routing of local host-management traffic via the network controller, by querying the management controller and/or the network controller for example. The query messaging performed during discovery operations may be performed using WS-Management and/or Alert Standard Format (ASF) messages.

Figure 1:
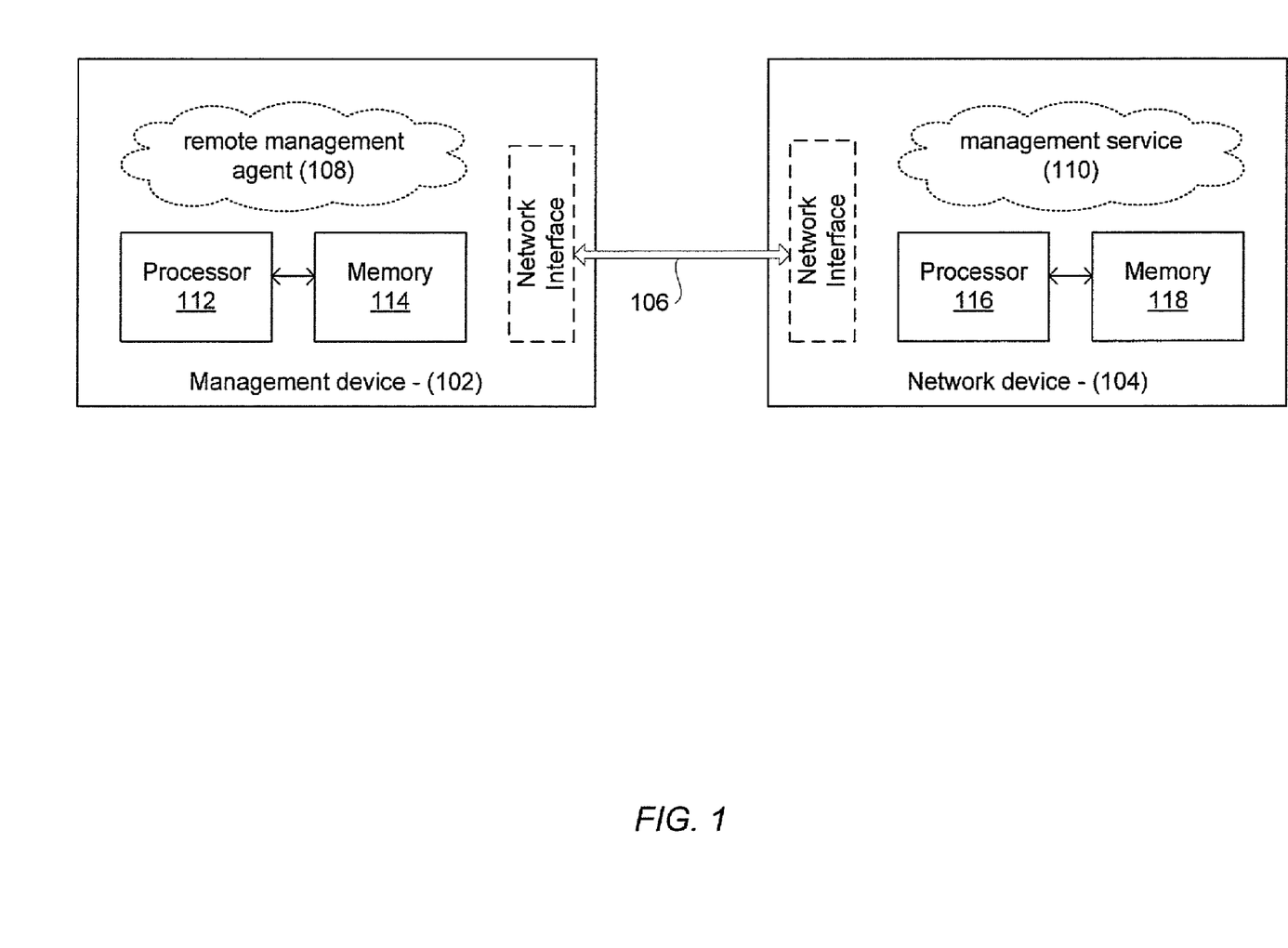
FIG. 1 is a block diagram that illustrates an exemplary communication setup between a management device and a network device, which may be utilized in accordance with an embodiment of the invention.

FIG. 1 is a block diagram that illustrates an exemplary communication setup between a management device and a network device, which may be utilized in accordance with an embodiment of the invention. Referring to FIG. 1, there is shown a management device 102, a network device 104, a management connection 106, a remote management agent 108, a management service 110, a processor 112, a memory 114, a processor 116, and a memory 118.

The management device 102 may comprise suitable logic, circuitry, code, and/or interfaces that may enable management of network devices, for example the network device 104, via a management connection, for example the management connection 106. For example, the management device 102 may be utilized by Information Technology (IT) operators and/or system administrators to enable management of a plurality of devices in an IT network. The management device 102 may comprise the processor 112, the memory 114, and/or the remote management agent 108, to enable performing management operations. Exemplary management operations may comprise discovering and/or navigating management resources in a network, manipulating and/or administrating management resources, requesting and/or controlling subscribing and/or unsubscribing operations, and executing and/or specific management methods and/or procedures. The management device 102 may perform management operations, via the remote management agent 108 for example, wherein the management device 102 may utilize a network interface to communicate with devices in a network via the management connection 106.

The remote management agent 108 may comprise a dedicated entity that is operable to enable performing management operations in the management device 102. The remote management agent 108 may comprise suitable logic, circuitry, code, and/or interfaces that may enable performing management operations based on one or more management standards. For example, the remote management agent 108 may enable performing control and/or management operations, based on Web Service Management (WS-Management) and/or Alert Standard Format (ASF) protocols. The remote management agent 108 may comprise a logical and/or software entity that may be integrated within an OS running in the management device 102; a logical and/or software entity that may be integrated within a network controller (NIC) which may be running in the management device 102; and/or a logical and/or software entity that may be integrated within a dedicated management sub-system within the management device 102.

The processor 112 may comprise suitable logic, circuitry, code, and/or interfaces that may enable performing control and/or processing operations in the management device 102. The invention may not be limited to a specific processor, but may comprise for example, a general purpose processor, a specialized processor or any combination of suitable hardware, firmware, software and/or code, which may be enabled to support and/or control operations of the management device 102. The memory 114 may comprise suitable logic, circuitry, code, and/or interfaces that may enable permanent and/or non-permanent storage and fetch of data and/or code used by the processor 112, for example, during management related processing operations. In this regard, the memory 114 may comprise various combinations of memory technologies, including, for example, read-only memory (ROM), random access memory (RAM), and/or Flash memory.

The network device 104 may comprise suitable logic, circuitry, code, and/or interfaces that may enable performing management operations that may initiated and/or requested by one or more management devices, for example the management device 102, via a management connection, for example the management connection 106. The network device 104 may be integrated into a network that may be managed by one or more instances of the management device 102. For example, the network device 104 may comprise a personal computer (PC) and/or a server, which may be operated in a network managed by the management device 102. The network device 104 may comprise the processor 116, the memory 118, and/or the management service 110 to enable participating in management operation, in a network that may be managed via the management device 102.

The management service 110 may comprise a dedicated entity that is operable to enable performing and/or supporting management operations in the network device 104. The management service 110 may comprise logic, circuitry, and/or code that may enable performing management operation based on one or more management standards. For example, the management service 110 may enable participating in control and/or management operations, based on WS-Management and/or ASF protocols. The management service 110 may comprise a logical and/or software entity that may be integrated within an OS running in the network device 104; a logical and/or software entity that may be integrated within a network controller (NIC) which may be running in the network device 104; and/or a logical and/or software entity that may be integrated within a dedicated management sub-system within the network device 104.

The processor 116 may comprise suitable logic, circuitry, code, and/or interfaces that may enable performing control and/or processing operations in the network device 104. The invention may not be limited to a specific processor, but may comprise for example, a general purpose processor, a specialized processor or any combination of suitable hardware, firmware, software and/or code, which may be enabled to support management based operations in accordance with the various embodiments of the invention. The memory 118 may comprise suitable logic, circuitry, code, and/or interfaces that may enable permanent and/or non-permanent storage and fetch of data and/or code used by the processor 116, for example, during management related processing operations. In this regard, the memory 118 may comprise various combinations of memory technologies, including, for example, read-only memory (ROM), random access memory (RAM), and/or Flash memory.

The management connection 106 may comprise networking interfaces and/or link that may enable communicating management based traffic between management devices, for example the management device 102, and network devices such as the network device 104. For example, the management connection 106 may comprise Ethernet (IEEE 802.3) based networking connections, which may operable to communicate management and/or non-management traffic packets, to and/or from the network device 104, to facilitate exchange of management messaging and/or data between the management device 102 and the network device 104.

In operation, management operations may be performed in the network device 102, wherein network packets may be communicated between the management device 102 and the network device 104 via the management connection 106, wherein the network packets may comprise management messaging and/or data based on one or more standards-based management protocols. For example, the remote management agent 108 and/or the management service 110 may enable utilizing WS-Management and/or ASF messaging, via the management connection 106, to enable management operations between the management device 102 and the network device 104.

The ASF protocol is a first generation management standard that may be utilized to perform out-of-band management operations, where network devices may be managed remotely by system administrators. The ASF protocol based management may comprise use of User Datagram Protocol (UDP) based stack to enable communication between management devices and network devices. Devices comprising ASF functionality and/or interfaces may be ASF capable, wherein said devices may perform management operations via ASF messages. For example, in instances where the network device 104 may be ASF capable, the management device 102 may utilize ASF based messaging to perform management of the network device 104.

More recently, the WS-Management protocol has been developed as the next generation management protocol. WS-Management is based on Web Services, which typically utilize SOAP (XML based messaging) and/or HTTP(S) as a SOAP transport for communications. SOAP over HTTP(S) may require use of HTTP/TLS/TCP stack implementation, which may ensure improved security, reliability, and OS-independence. Within the WS-Management protocol, the Common Information Model (CIM) has been defined to provide object oriented representation of management data and/or managed subsystem which may be utilized during WS-Management operations. Managed devices may also comprise Intelligent Platform Management Interface (IPMI) and/or ASF internal interfaces/protocols to support out-of-band management operations that may be performed via WS-Management messages. For example, the network device 104 may comprise a WS-Management stack to support receiving and/or sending WS-Management based messaging to enable supporting remote management operations in the network device 104, by the management device 102 for example.

The WS-Management stack may enable generating and/or processing WS-Management based data and/or messaging that may be utilized to request and/or perform management services based on, for example, CIM binding. The WS-Management stack may enable implementing and/or using WS-Management services standards. The network device 104 may also comprise an IPMI stack to facilitate internal communications between components of the network device 104, during management operations for example. Consequently, TCP/IP based communications, via the management connection 106, may be utilized during WS-Management operations between the management device 102 and the network device 104. The management device 102 and/or the network device 104 may utilize network cards (NIC) to enable sending and/or receiving network traffic via the management connection 106. Network controllers that may be utilized in the management device 102 and/or the network device 104 may process network traffic that may comprise WS-Management based messaging, which may be transmitted and/or received via TCP/IP packets.

In an exemplary aspect of the invention, the network device 104 may be configured to enable performing management operations locally, by interacting directly, for example, with the network device 104, utilizing similar mechanisms as the ones used during remote management operations. For example, rather then accessing the network device 104 remotely, via the management device 102, system administrators may perform management operations directly in the network device 104. In an embodiment of the invention, similar functionality and/or interfaces that may be used to communicate during management operations performed via the management device 102 may also be used directly via the network device 104. For example, a web browser based function may be supported, via the network device 104, to enable performing and/or triggering WS-Management based operations directly within the network device 104. Consequently, the network device 104 may be operable to support local management messaging that is communicated from/to the network device 104 in similar fashion as remote management messaging that is communicated via network traffic.

Figure 2A:
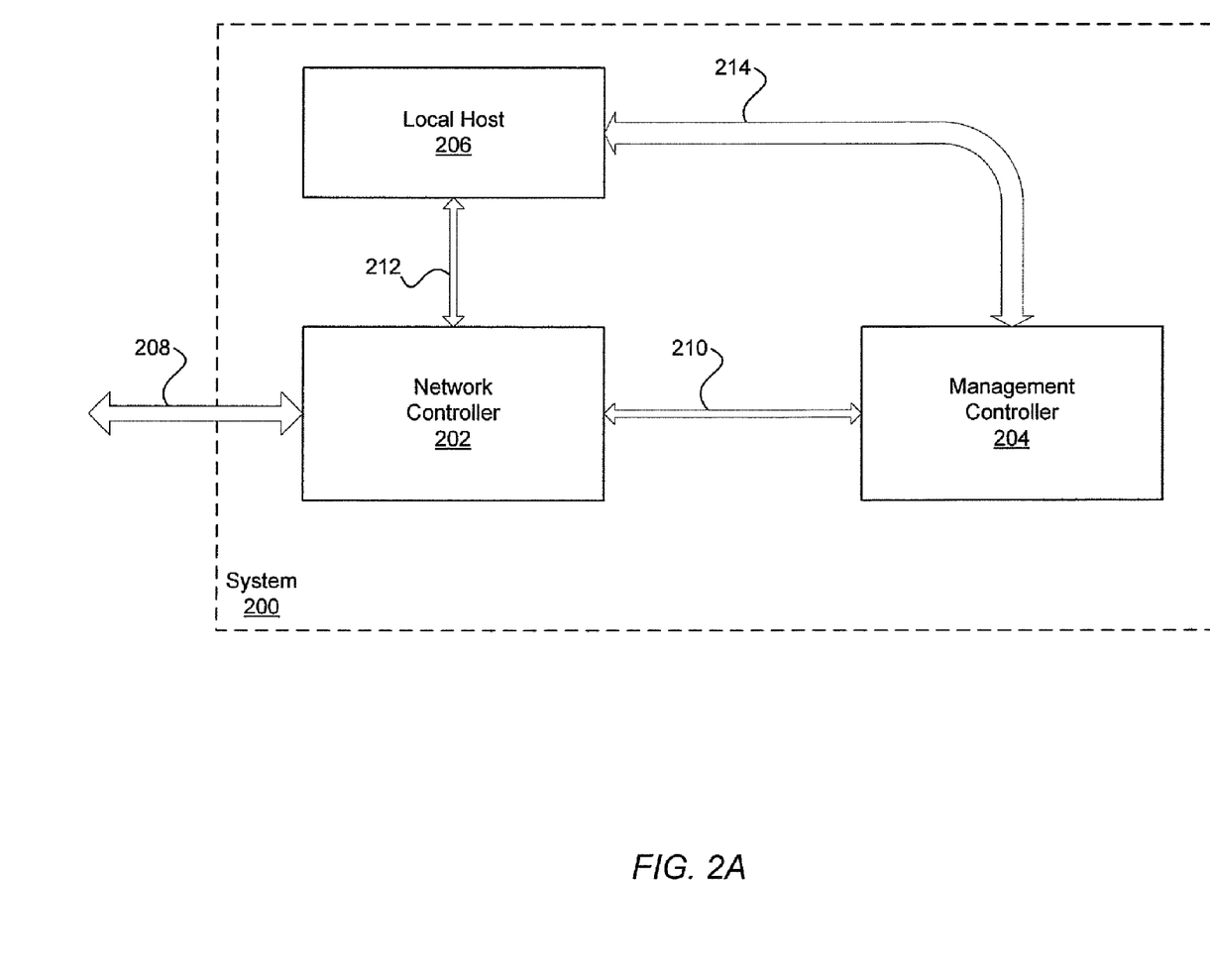
FIG. 2A is a block diagram that illustrates an exemplary system that comprises a network controller and a management controller, which may be utilized to enable processing of network and management traffic, in accordance with an embodiment of the invention.

FIG. 2A is a block diagram that illustrates an exemplary system that comprises a network controller and a management controller, which may enable processing of network and management traffic, in accordance with an embodiment of the invention. Referring to FIG. 2A, there is shown a system 200, a network controller 202, a management controller 204, a local host 206, network traffic 208, management traffic 210, host traffic 212, and host-management link 214.

The system 200 may comprise the network controller 202, the management controller 204, the local host 206, and may also comprise suitable logic, circuitry, code, and/or interfaces that may enable reception, transmission, and/or processing of network traffic; and/or participating in management operations based on one or more management standards. For example, the system 200 may be integrated in, and/or may correspond to various components in the network device 104, and may enable the network device 104 to participate in WS-Management and/or ASF management operations, substantially as described in FIG. 1A.

The network controller 202 may comprise suitable logic, circuitry, code, and/or interfaces which may enable processing of the network traffic 210. The network traffic 210 may comprise received and/or transmitted network packets communicated via a network connection, for example an Ethernet (IEEE 802.3) connection. The network traffic 210 may comprise packets that are sent to and/or from the local host 206, which may be communicated between the network controller 204 and the local host 206 via the host traffic 212. The host traffic 212 may be communicated via one or more connections based on one or more interfaces. For example, the host traffic 212 may be communicated via a Peripheral Component Interconnect Express (PCI-E) bus.

The network controller 206 may also be operable to communicate with the management controller 204 to enable exchange of management based messaging and/or data, via the management traffic 210, which may be communicated between the management controller 204 and external devices, for example. In that regard, the management traffic 210 may comprise data and/or messages that may be transmitted and/or received in the system 200 during management operations. For example, the management traffic 210 may comprise WS-Management based messaging communicated by the system 200 to enable performing of WS-Management services. The management traffic 210 may be communicated, for example, via Network Controller Sideband Interface (NC-SI) based connections.

The management controller 204 may comprise suitable logic, circuitry, code, and/or interfaces that may enable managing and/or controlling management based operations. The management controller 204 may be operable to process management messaging and/or data, received and/or transmitted via the network controller 202 for example, which may be based on a specific management standard including the WS-Management standard for example. In that regard, the management controller 204 may be operable to determine and/or perform management operations based on the WS-Management stack. The management controller 204 may also be operable to interact with other components in the system 200 to communicate, manage, control, and/or process management messaging and/or data. For example, the management controller 204 may be enabled to communicate with the local host 206 to enable performing management operations that are requested and/or controlled locally and/or directly via the system 200. The management controller 204 may communicate directly with the local host 206 via a Low Pin Count (LPC) bus, for example.

In operation, the network controller 202 may enable processing network traffic 210. In the downlink direction, the network controller 202 may be operable to process network packets to separate and/or route inbound host-based and management-based messaging. In the uplink direction, the network controller 202 may be operable to receive messages which originate from the local host 206 and/or the management controller 204. The network controller 202 may then generate network packets that may be communicated external to the system 200, by the network traffic 210. The management controller 204 may be utilized, in the system 200, to handle the processing management messages and/or data received from external devices and/or systems, and/or to perform, manage, and/or control management operations, based on the WS-Management standard for example.

In an exemplary aspect of the invention, the management controller 204 may be operable to perform, manage, and/or control management operations that may be initiated and/or requested directly and/or locally in the system 200. local interactions with the system 200 may be facilitated via, for example, a web browser-based interface, which may be supported via the local host 206. The local host 206 may communicate the management commands and/or requests to the management controller 204, and/or receive management related data and/or responses, via the host-management link 214. Direct interfacing between the management controller 204 and the local host 206 may be register based and/or bus based, and may require dedicated communication transport stacks that may be unique to used interfaces. Communication via the host-management link 214 may utilize, for example, Keyboard Controller Style (KCS) based interfaces to facilitated communication via a LPC bus. Use of dedicated and/or direct host-management interfacing, however, may not be desirable because it may require additional and/or dedicated support via the local host 206 and/or the management controller 204. The local host 206 may also need to have knowledge about the management controller 204 and/or the local host 206, and/or their available interfacing capabilities, to facilitate such direct interfacing. This may also lead to requiring use of separate communication stacks, via the local host 206 and/or management controller 204, based on the whether management communication, via the local host 206, is local or remote. In addition, use of dedicated host-management link (e.g., via LPC bus) may degrade performance due to limitations in data transfer rates. In additional, delays may also be caused by necessary interface-specific processing on both ends. For example, in cases where a WS-Management stack is utilized, in the local host 206, to perform management operations requested remotely, a different stack, an IPMI based stack for example, may be utilized to enable use of LPC based interface to communicate with the management controller 204. Therefore, different application programming interface (API) and/or access protocol may be used and/or needed during direct host-management controller interaction via the host-management link 214.

Accordingly, in various embodiments of the invention, the network controller 202 may be operable to provide pass-through routing support, wherein the local host-management controller traffic may be communicated via the network controller 202 to make use of, for example, already existing interfaces between the network controller 202, and the local host 206 and the management controller 204, respectively. For example, a local host-management routing functionality may be provided via the network controller 202, which may enable communication of management messages and/or data between the local host 206 and the management controller 204 using existing network processing function in the local host 206, such the management messages and/or data may be communicated as network messages. Accordingly, the network controller 202 may be operable to provide pass-through communication support to facilitate local host-management traffic routing, wherein the network controller 202 may provide and/or support, for example, control and/or configuration logic, packet filtering capabilities, and/or communication interfaces to enable such communication between the local host 206 and the management controller 204.

Various methods may be utilized to enable providing pass-through routing support via the network controller 202. The pass-through routing may be provided based on virtual local area network (VLAN). The local host 206 and/or the management controller 204 may utilize, for example, virtual network interface controller (VNIC) based functionality to enable local host-management communication via the network controller 202. The local host-management traffic may be, for example, filtered in the network controller 202 based on source MAC addressing information and/or virtual local area network (VLAN) information, where the VLAN operations, which may comprise VLAN tag insertion and/or stripping, may be done within the network controller 202 during routing of local host-management traffic. The pass-through routing support via the network controller 202 may also be provided based on packet filtering within the network controller 202, where the local host-management traffic packets may be communicated by the local host 206 and/or the management controller 204 identical to communication of external traffic packets. Alternatively, interfacing to the management controller 204, via the network controller 202, may be presented to the local host 206 as an interface that is similar but separate and/or distinct from the local host's external networking interface via the network controller 202. In some instances, use of the external network access of the local host 206 and/or the management controller via the network controller 202, however, may present some challenges. For example, local host-management communication, via the network controller 202, may not be available when the system 200 loses external network access because as far the local host 206 is concerned, the network is perceived to be down. In addition, even in cases where there may be external network access, if messaging intended for the management controller 204 is communicated as outbound network traffic, messages may be communicated by the network controller 202 external to the system 200. Because switching standards prevent resending packets received in network switches via the same ports they were received on, the network packets carrying host-management messaging may not be send back to the network controller 202 to be sent to the management controller 204. Accordingly, in an exemplary embodiment of the invention, local host-management pass-through routing support may be provided via the network controller 202 such that communication of management messages and/or data between the local host 206 and the management controller 204 may utilize existing network processing in the local host 206, but may be performed distinct from the local host's external network messaging. This functionality may enable the local host 206 to send and/or receive management data via the host traffic 212 using unique and/or dedicated interfacing parameters during local host-management communication such that the controller 202 may then be operable to distinguish between external traffic and local management traffic which may be communicated directly between the network controller 202 and the management controller 204, via the management traffic 210.

Figure 2B:
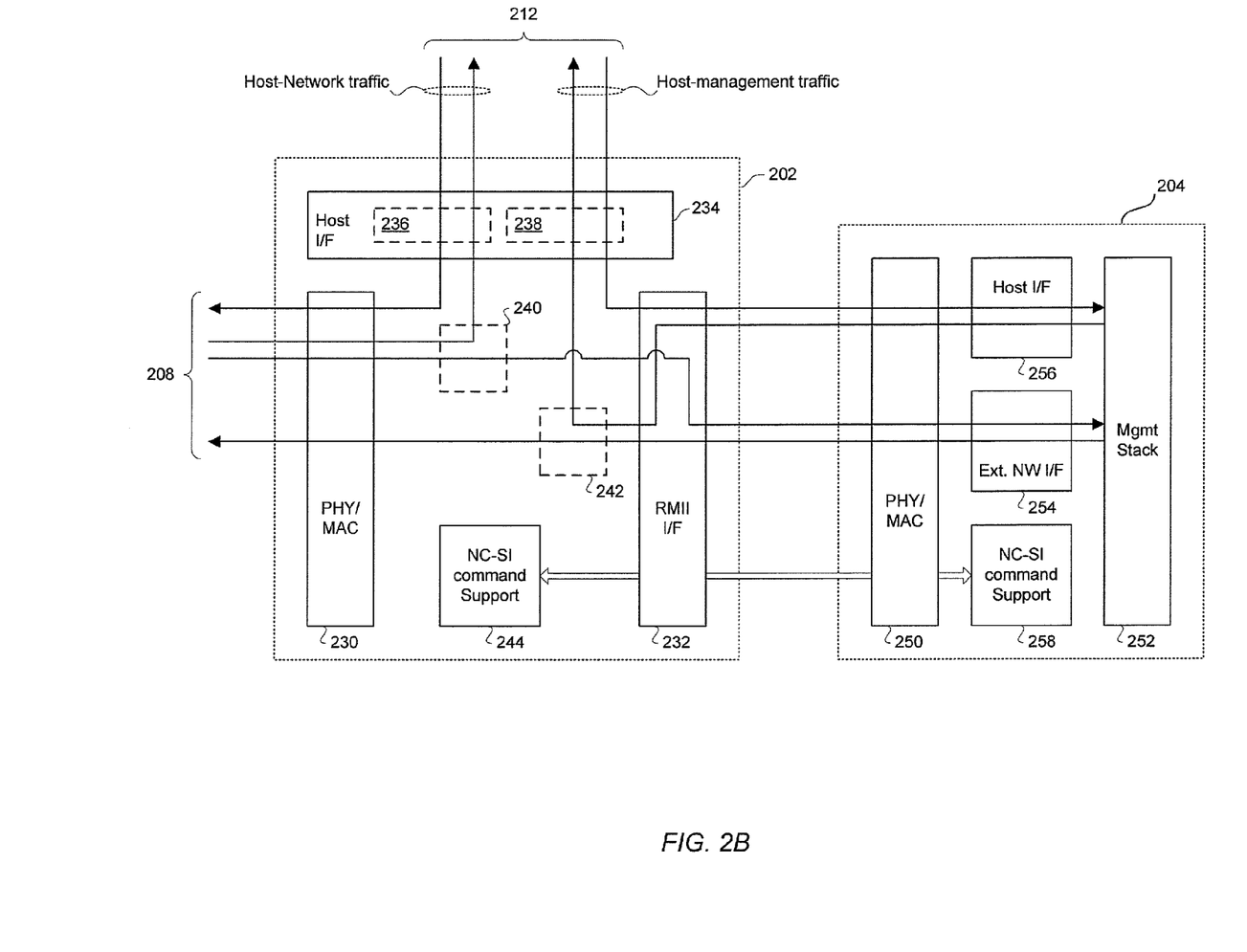
FIG. 2B is a block diagram illustrating host-management controller traffic processing and/or filtering in a device via an exemplary system that comprises a network controller and a management controller, which may be utilized to enable supporting dedicated local host-management traffic, in accordance with an embodiment of the invention.

FIG. 2B is a block diagram illustrating host-management controller traffic processing and/or filtering in a device via an exemplary system that comprises a network controller and a management controller, which may be utilized to enable supporting dedicated local host-management traffic, in accordance with an embodiment of the invention. Referring to FIG. 2B, there is shown the network controller 202, the management controller 204, a network-side physical layer/medium access control access (PHY/MAC) processing module 230, and a Reduced Media Independent Interface (RMII) function 232. There is also shown a host interface 234, an inbound network packet filtering module 240, an outbound management packet filtering module 242, network-side NC-SI command support 244, a management-side PHY/MAC processing module 250, and a management stack processing module 252. Also shown in FIG. 2B are an external networking interface 254, a host networking interface 256, and a management-side NC-SI command support 258.

The network-side PHY/MAC processing module 230 may comprise suitable logic, circuitry, code, and/or interfaces that may enable performing PHY and MAC processing operations within the network controller 204 during external transmission and/or reception of data. The network-side PHY/MAC processing module 230 may be operable to enable physical transmission and/or reception of bit streams, which may correspond to transmitted and/or received network packets, via physical links that may be based on one or more network connectivity standards, including Ethernet (IEEE 802.3) physical layer interface for example. The network-side PHY/MAC processing module 230 may also be operable to perform MAC addressing and/or channel access management operations, which may be based on one or more specific network connectivity standards. For example, in instances where the network traffic 208 may be transmitted and/or received via Ethernet (IEEE 802.3) connections, the network-side PHY/MAC processing module 230 may enabled performing MAC operations based on the Carrier Sense Multiple Access With Collision Detection (CSMA/CD) protocol.

The RMII function 232 may comprise suitable logic, circuitry, code, and/or interfaces that may be operable to provide physical transfer of data between network controller 202 and the management controller 204. The data transferred via the RMII function 232 may comprise, for example, Ethernet frames that may comprise PHY/MAC addressing information. Communication between the network controller 202 and the management controller 204 may be performed based on the network controller sideband interface (NC-SI), which is a DMTF protocol that defines interfacing between a management controllers and network controllers during transmission and/or reception of management traffic by the management controllers via the network controllers, during out-of-band management operations for example. In this regard, the network-side NC-SI command support 244 and/or the management-side NC-SI command support 258 may be operable to provide support NC-SI based communication between the network controller 202 and the management controller 204.

The host interface 234 may comprise suitable logic, circuitry, code, and/or interfaces that may enable data communication between the network controller 204 and the local host 206. The host interface 234 may support physical transfer of data between the network controller 202 and the local host 206 utilizing an inter-system bus. For example, the host interface 234 may utilize a Peripheral Component Interconnect Express (PCI-e) bus to communicate host traffic to and/or from the network controller 202. In an exemplary aspect of the invention, the host interface 234 may comprise two different ports, an external networking port 236 and a management port 238. Data that may be sent to and/or received via the network traffic 208 may be communicated between the local host 206 and the network controller 202. Host-management data, however, may be distinctly communicated between the local host 206 and the management controller 204 via the management port 238.

The inbound network packet filtering module 240 may comprise suitable logic, circuitry, code, and/or interfaces that may enable filtering external network packets received in the network controller 202, via the PHY/MAC network-side PHY/MAC processing module 230 for example, to determine whether to route these packets to the local host 206 or to the management controller 204. The outbound management packet filtering module 242 may comprise suitable logic, circuitry, code, and/or interfaces that may enable filtering data received in the network controller 202 from the management controller 204, via the RMII function 232 for example, to determine whether to route the data internally to the local host 206 or to transmit the data external to the system 200.

The management-side PHY/MAC processing module 250 may comprise suitable logic, circuitry, code, and/or interfaces that may enable performing PHY and MAC processing during communication of data between the management controller 204 and the network controller 202. The management-side PHY/MAC processing module 250 may be operable to enable performing physical transfer of data comprising PHY/MAC based addressing. The external networking interface 254 may comprise suitable logic, circuitry, code, and/or interfaces that may enable processing of packets that are communicated between the management controller 204 and one or more external entities and/or devices via the network controller 202.

The management stack processing module 252 may comprise suitable logic, circuitry, code, and/or interfaces that may enable processing messaging and/or data based on one or more management standards, during management operations for example. The management stack processing module 252 may be operable to support WS-Management based messaging and/or data. The host interface 254 may comprise suitable logic, circuitry, code, and/or interfaces that may enable processing of packets that are communicated between the management controller 204 and the local host 206 via the network controller 202. The host interface 254 may comprise, for example, a server function that may enable providing addressing information may enable simulating a network-like path to enable the local host 206 to communicate with the management controller 204 via network the controller 202.

In operation, the network controller 202 may enable external communication for the local host 206 and/or the management controller 204. The network controller 202 may be operable to transmit and/or receive Ethernet packets that may comprise data and/or messages originating from and/or destined for the local host 206 and/or the management controller 204, which may be communicated by external entities and/or devices. The network-side PHY/MAC processing module 230 may be operable, for example, to perform physical layer and/or MAC operations. Received external network packets may be filtered via the inbound network packet filtering module 240 in order to determine whether these packets are destined for the local host 206 or to the management controller 204. The filtering may be performed based on the MAC/IP addressing information, and/or other protocol header and/or payload fields, corresponding to the local host 206 and/or management controller 204. Based on this determination, the packets may be routed accordingly.

Data communicated between the local host 206 and one or more external devices may be transferred between the local host 206 and the network controller 202 via the external networking port 236 in the host interface 234. During out-of-band management operations, network packets comprising management data and/or messaging may be communicated by the remote management agent 108, via the management connection 106, to the system 200 where the network controller 202 may be operable to receive and/or transmit the network packets. External networking packets may be communicated between the management controller 204 and the network controller 202 using NC-SI interface. The RMII function 232 and the management-side PHY/MAC processing module 250 may provide physical transfer of data between the network controller 202 and the management controller 204.

In an exemplary embodiment of the invention, the network controller 202 may be operable to enable local host-management communication between the local host 206 and the management controller 204 using existing interfaces between the network controller 202 and the local host 206, and/or between the network controller 202 and the management controller 204. The host-management communication between the local host 206 and the management controller 204, via the network controller 202, may simulate network traffic to enable use of networking functionality in the local host 206, for example. The local host 206 may transmit and/or receive packets via the management port 238 the same way as the local host 206 may utilize external networking port 236 to communicated network traffic via the network controller 202. The local host 202 may, however, utilize separate transmit and/or receive queues and/or interrupts during communication via the management port 238.

To facilitate use of the management port 238 to simulate network-like communication between the management controller 204 and the local host 206, the management controller 204 may be operable to designate addressing information dedicated for local management communication, which may comprise a unique MAC/IP address, which may be used by the local host 206 to exchange packets comprising management messaging and/or data with the management controller 204. The addressing information for the management controller 204 may be preset statically, and used thereafter. Alternatively, the IP address corresponding to the management controller 204 may assigned automatically from a predetermined range of available addresses, and/or may be generated dynamically, utilizing DHCP server function for example, which may be run in the management controller 204. The MAC/IP address assigned to the management controller 204 to enable local host-management traffic must be distinct from MAC/IP addresses used by the local host 206 and the management controller 204 during external network traffic communication. Local management data and/or messaging may be communicated between the network controller 202 and the local host 206 via the management port 238 in the host interface 234. The local management data and/or messaging may then be communicated between the network controller 202 and the management controller 204 using existing interfaces that are otherwise used to route external management and/or data between the network controller 202 and the management controller 204. Packets received in the network controller 202 from the management controller 204 may filtered via the outbound management packet filtering module 242 to determine whether these packets are destined for the local host 206 or for external entities and/or devices, and the packets may then be routed accordingly. The filtering may be performed based on the MAC/IP address information, and/or other protocol header and/or payload fields. For example, packets comprising the MAC/IP address utilized in external networking may be communicated by the network controller 202, via the network-side PHY/MAC processing module 230, as external network traffic. Packets comprising the MAC/IP address assigned for local host-management communication, however, may communicated to the local host 206 via the management port 238 in the host interface 232.

Figure 3:
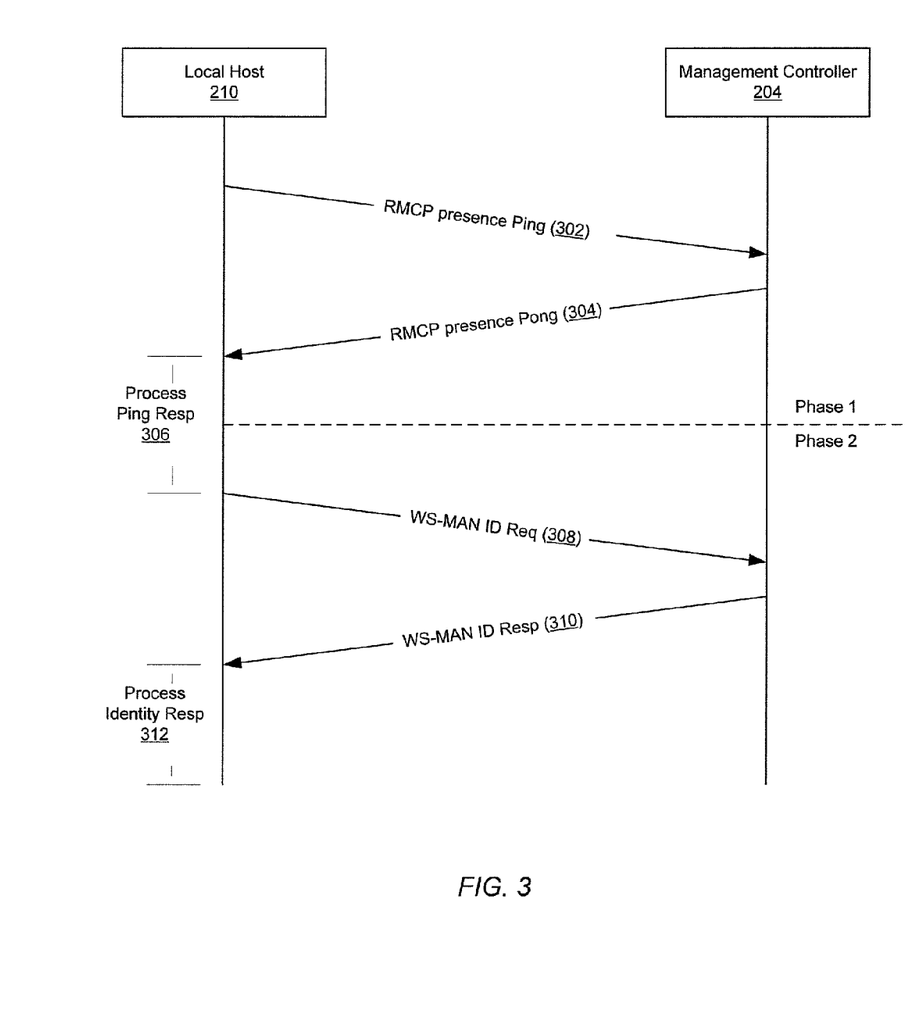
FIG. 3 is a flow diagram that illustrates exemplary messaging during management discovery between a local host and a management controller, in accordance with an embodiment of the invention.

FIG. 3 is a flow diagram that illustrates exemplary messaging during management discovery between a local host and a management controller, in accordance with an embodiment of the invention. The local host 206 may be operable to performing discovery of local management services, which may available via the management controller 204. Where the addressing information of the management controller 204 may not be known, the local host 206 may perform a 2-phase procedure, via the network controller 202, to determine the presence of the management controller 204 and/or to obtain addressing information to enable subsequent host-management controller communication. The messaging described hereafter may be performed by sending and/or receiving, for example, Ethernet frames, that may be generated and/or processed via the local host 206 and communicated via the network controller 202.

In step 302, the local host 206 may send, via the management port 238, a RMCP Presence Ping to determine the presence of the management controller 204, and/or to obtain addressing information of the management controller 204. In step 304, the management controller 204 may reply to the local host 206 by sending a RMCP Presence Pong message, which may comprise addressing information for communicating with the management controller 204 within the system 200, and may also comprise information that may confirm presence of WS-Management services in the management controller 204. Wherein the addressing information of the management controller 204 are known, for example if the management controller 204 has a statically preset addressing information, and/or availability of WS-Management based services via the management controller 204 is known, the first stage comprising steps 302 and 304 may be skipped. In step 306, the local host 206 may determine available WS-Management services in the management controller 204, by processing, for example, received RMCP Presence Pong messages. In step 308, the local host 206 may send a WS-MAN Identity Request message to the management controller 204 to enable determining capabilities of WS-Management services that may be present in the management controller 204. In step 310, the management controller 204 may reply by sending a WS-MAN Identity Response message to the local host 206. The WS-MAN Identity Response message may comprise information on the capabilities of the WS-Management services in the management controller 204. In step 312 the local host 206 may process the received WS-MAN Identity Response message from the management controller 204 to determine capabilities of the WS-Management services in the management controller 204.

Figure 4:
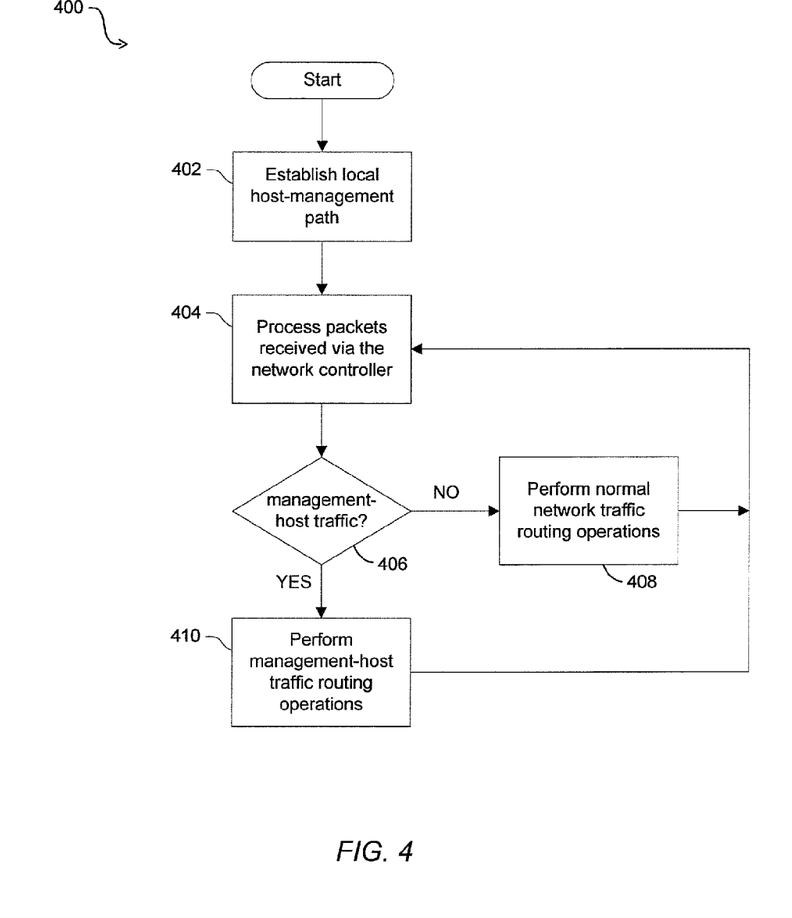
FIG. 4 is a flow chart that illustrates exemplary use of dedicated local host-management communication routing via network controller in a system, in accordance with an embodiment of the invention.

FIG. 4 is a flow chart that illustrates exemplary use of dedicated local host-management communication routing via network controller in a system, in accordance with an embodiment of the invention. Referring to FIG. 4, there is shown a flow chart 400 comprising a plurality of exemplary steps, which may enable use of pass-through routing support via a network controller to facilitate local host-management controller communication.

In step 402, a local host-management controller link may be established by the network controller 203 to enable performing local management operations. For example, the local host 206 and/or the management controller 204 may establish local host-management connection via the management port 238 in the network controller 202. Addressing information that may be utilized to enable communication between the local host 206 and the management controller 204 may be determined. The addressing information may be dynamically generated via the management controller 204.

In step 404, the network controller 202 may process packets received from the local host 206 and/or the management controller 204. For example, the network controller 202 may receive packets from the local host 206 via the host interface 234 and/or from the management controller 204 via the RMII function 232. In step 406, a determination of whether the received packets correspond to host-management controller traffic may be performed in the network controller 202. For example, with regard to packets received from the local host 206, the determination may be made based on the port via which they were received. Packets received via the management port 238 may be determined to correspond to local host-management controller traffic while Packets received via the external networking port 236 may be determined to correspond to external network traffic communication. A determination of the destination of packets received from the management controller 204 may be made based on the outbound management packet filtering module 242. In instances where it may be determined that packets received in the network controller 202 do not correspond to local host-management controller traffic; the exemplary steps may proceed to step 408. In step 408, external network traffic routing operations may be performed by the network controller 202. For example, packets received from the local host 206, via the external networking port 236, and/or from the management controller 204 may be processed via the network-side PHY/MAC processing module 230 for transmission as network packets.

Returning to step 406, in instances where it may be determined that packets received in the network controller 202 correspond to local host-management controller traffic; the exemplary steps may proceed to step 410. In step 410, local host-management controller traffic packets may be communicated to the management controller 204, based on the NC-SI interface, via the RMII function 232 and the management-side PHY/MAC processing module 250, and/or may be communicated to the local host 206 via the management port 238.

Various embodiments of the invention may comprise a method and system for a network controller based pass-through communication mechanism between local host and management controller. The network controller 202 may be operable to route local host-management traffic between a local host 206 and the management controller 204 within the system 200. The local host 206 may be operable to utilize its network processing resources and function during communication of the local host-management traffic via the network controller 202. The management port 238 may be configured in the host interface 234 in the network controller 202 to enable receiving and/or transmitting local host-management traffic communicated from and/or to the local host 206 while the networking port 236 in the host interface 234 is utilized to communicate the local host's network traffic 212 via the network controller 202. The local host-management traffic is communicated between the network controller 202 and the management controller 204 via a NC-SI interface, utilizing the RMII function 232, the network-side NC-SI command support 244, the management-side NC-SI command support 258, and management-side PHY/MAC processing module 250, which are normally utilized to enable communicating management traffic communicated between the management controller 204 and external entities via the network controller 202.

The network controller 202 may be operable to utilize packet filtering to enable routing the local host-management traffic, based on, for example, different MAC/IP addresses assigned to the management controller 204 for remote and local management operations, respectively. The management controller 204 may be assigned Internet protocol (IP) based addressing information, a MAC/IP address for example, for use during routing of local host-management traffic. Accordingly, the packet filtering may be performed based on MAC/IP addresses. The IP address assigned to the management controller 204 may be preset statically, assigned automatically from a predetermined list of available IP addresses, and/or configured dynamically via a Dynamic Host Configuration Protocol (DHCP) server function, which may run within the management controller 204. The packet filtering may be performed on all received inbound packets, via the inbound network packet filtering module 240, and/or on outbound management packets communicated via the outbound management packet filtering module 242 in the management controller 204. The local host 206 may be operable to discover availability of routing of local host-management traffic via the network controller 202, by querying the management controller 204 and/or the network controller 202 for example. The query messaging performed during discovery operations may be performed using WS-Management and/or Alert Standard Format (ASF) messages.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a network controller based pass-through communication mechanism between local host and management controller.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for device management, the method comprising:
   in a network device comprising a local host, a management controller and a network controller:
      routing within said network device, local host-management traffic between said local host and said management controller via said network controller, wherein said local host is operable to communicate said local host-management traffic via said network controller utilizing network processing resources and functions within said local host; and
      discovering, by said local host, availability of said routing of local host-management traffic via said network controller.

2. The method according to claim 1, comprising configuring a dedicated management port in a host interface in said network controller to enable reception and/or transmission of said local host-management traffic from and/or to said local host.

3. The method according to claim 2, comprising configuring a separate networking port in a host interface in said networking controller to enable receiving and/or transmitting networking traffic from and/or to said local host during use of said dedicated management port to route said local host-management traffic.

4. The method according to claim 1, comprising configuring Media Access Control (MAC) and/or Internet Protocol (IP) address routing information via said network controller to facilitate said routing of local host-management traffic between said local host and said management controller.

5. The method according to claim 4, comprising generating said MAC and/or IP address routing information statically and/or dynamically.

6. The method according to claim 5, wherein said dynamic IP addressing comprises use of Dynamic Host Configuration Protocol (DHCP) based server function or automatically selecting one or more IP addresses from a predetermined list of private IP addresses.

7. The method according to claim 1, comprising communicating said local host-management traffic between said network controller and said management controller via a Network Controller Sideband Interface (NC-SI) link.

8. The method according to claim 1, comprising performing query messaging between said local host and said management controller during said discovery, wherein said query messaging is based on management interface supported via said network device; said management interface comprising WS-Management and/or Remote Management and Control Protocol (RMCP) based messaging.

9. A system for device management, the system comprising:
   one or more circuits for use in a network device, said one or more circuits comprising a local host, a management controller and a network controller, wherein said one or more circuits are operable to:
      route within said network device, local host-management traffic between said local host and said management controller via said network controller, wherein said local host is operable to communicate said local host-management traffic via said network controller utilizing network processing resources and functions within said local host; and
      wherein said one or more circuits are operable to discover, by said local host, availability of said routing of local host-management traffic via said network controller.

10. The system according to claim 9, wherein said one or more circuits are operable to configure a dedicated management port in a host interface in said network controller to enable reception and/or transmission of said local host-management traffic from and/or to said local host.

11. The system according to claim 10, wherein said one or more circuits are operable to configure a separate networking port in a host interface in said networking controller to enable receiving and/or transmitting networking traffic from and/or to said local host during use of said dedicated management port to route said local host-management traffic.

12. The system according to claim 9, wherein said one or more circuits are operable to configure Media Access Control (MAC) and/or Internet Protocol (IP) address routing information via said network controller to facilitate said routing of local host-management traffic between said local host and said management controller.

13. The system according to claim 12, wherein said one or more circuits are operable to generate said MAC and/or IP address routing information statically and/or dynamically.

14. The system according to claim 13, wherein said dynamic IP addressing comprises use of Dynamic Host Configuration Protocol (DHCP) based server function or automatically selecting one or more IP addresses from a predetermined list of private IP addresses.

15. The system according to claim 9, wherein said one or more circuits are operable to communicate said local host-management traffic between said network controller and said management controller via a Network Controller Sideband Interface (NC-SI) link.

16. The system according to claim 9, wherein said one or more circuits are operable to use query messaging between said local host and said management controller during said discovery, wherein said query messaging is based on management interface supported via said network device; said management interface comprising WS-Management and/or Remote Management and Control Protocol (RMCP) based messaging.

* * * * *